INVENTOR
FRITHO RUDGER
ERICK MULDER

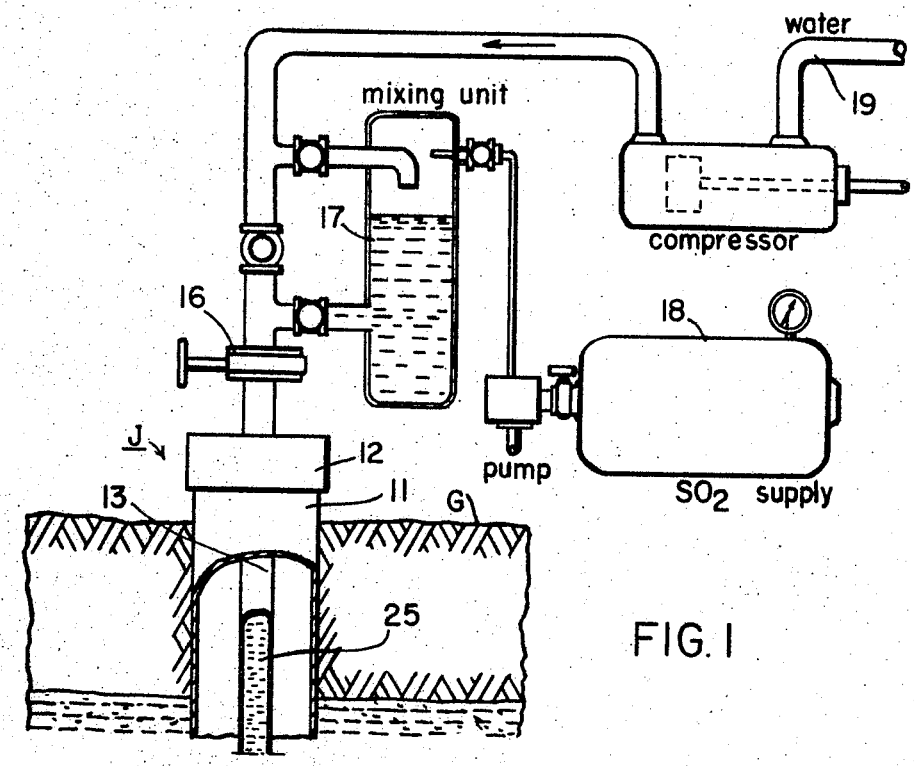
FIG. 1
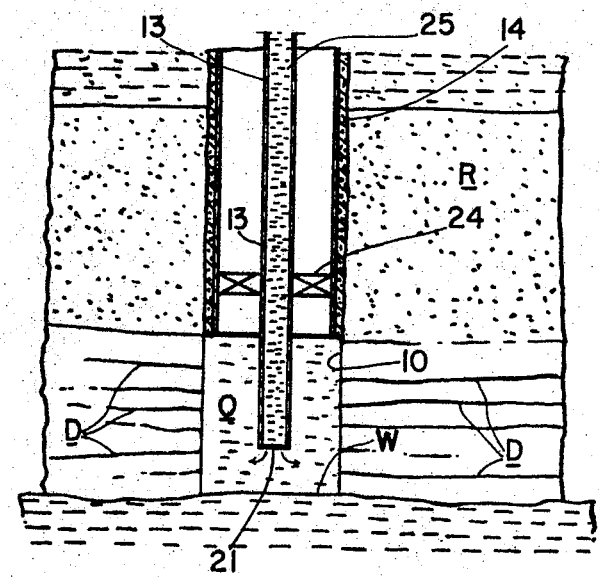
INVENTOR
FRITHO RUDGER
ERICK MULDER

INVENTOR
FRITHO RUDGER
ERICK MULDER

United States Patent Office 3,326,289
Patented June 20, 1967

3,326,289
PROCESS FOR TREATING FORMATIONS WITH SULFUR DIOXIDE SOLUTIONS
Fritho R. Erick Mulder, Calgary, Alberta, Canada, assignor to Home Oil Company Limited, Calgary, Alberta, Canada, a corporation of Canada
Filed Mar. 10, 1964, Ser. No. 350,837
Claims priority, application Canada, Apr. 24, 1963, 873,980
8 Claims. (Cl. 166—42)

This invention relates to chemical treatment of underground earth formations, and more particularly is concerned with the introduction of aqueous solutions of sulfur dioxide under pressure into a well penetrating a reservoir rock for the purpose of increasing the permeability of the formations to fluids.

Heretofore a variety of chemically active substances have been employed in what are generally known as "acidizing" operations, for the purpose of opening up channels and fissures leading into a carbonate rock formation from a well penetrating such formation. Such passages as are formed serve as flow channels of greatly enlarged cross-sectional areas as compared with untreated formations, in order that increased flow rates for fluids such as petroleum crudes produced from the formation may be achieved.

At the temperature and pressure conditions encountered in deep underground formations into which wells for producing petroleum are drilled, the highly reactive acids such as hydrochloric, nitric, and sulfuric, tend to be spent rapidly in reactions with the carbonate minerals, so that the benefit of the acidizing operation tends to be offset by the disproportionate enlargement of chambers immediately adjacent the well bottom, rather than in opening up flow channels at a considerable distance from the well. In order to extend the reaction time so that the injected acids will remain active throughout a larger volume of rock, inhibiting material must be added to these strong acids.

I have discovered that sulfurous acid, produced by dissolving a minor weight proportion of sulfur dioxide in water, acts as a moderately strong acid and has a number of highly desirable properties making it suitable as an injection fluid. Concentrations of sulfur dioxide, hereinafter referred to as $SO_2$, ranging from a few parts per million in water to several thousand parts, have inherently lower rates of reaction with carbonate rocks than do the inhibited conventional strong acids used heretofore. When a solution of $SO_2$ in water is injected into a well in a carbonate rock such as limestone or dolomite, its leaching effect may be expected to extend for suitably large distances radially of the well for effecting enlargement of the flow channels, at practical injection rates. Moreover, relatively high concentrations of $SO_2$ may be held in solution in water at bottom-hole pressures, such strong solutions being however not substantially more reactive at the elevated temperatures of deep wells than are dilute solutions, so that as the reactions proceed the water vehicle serves as a reservoir of potentially active acid. Furthermore the water may be used as a vehicle for injecting commingled but undissolved excess liquefied sulfur dioxide into the formation, which passes into solution as the dissolved portion is spent in reactions.

In areas where elemental sulfur is available as a by-product of refining operations which strip crude oil or gas of its contaminating sulfides, such material provides an economical and simply handled basic material for the injection processes of the present invention. The sulfur requires only to be burned in air and the sulfur dioxide gas so produced is then dissolved under pressure in the injection water which is forced down the well into the underground formation. In a typical operation according to the invention, the "acidizing" of a new well into a producing limestone reservoir rock may be effected in a short time and with low cost of materials, as compared with conventional acidizing. Assuming that the extent to which the leaching operation is desired to penetrate such formation which is twelve feet thick is, for example, to a radius of twenty feet, approximately 500 pounds of sulfur dioxide generated by burning 250 pounds of elemental sulfur at the well head dissolved in 125,000 pounds of injection water will suffice. Assuming such formation has an initial porosity of 12% and an initial permeability to water of a fraction of one millidarcy (which unit is well defined in the sicence of reservoir mechanics), the injection of the amount of acidulated water referred to will suffice to promote reactions along flow passages and channels between the ionized portion of the solution and the carbonate minerals, to produce extensive leaching and to increase the apparent permeability by a large factor. In subsequent production of petroleum from the well, the pressure drop required to displace petroleum crude along these flow channels will be low, simulating an equivalent increase in the well diameter to the radial limit of leaching. The development of flow channels may of course be carried to any extent desired, by prolonged injection of sulfur dioxide and water, for example out to distances of hundreds of feet or more from an injection wall.

Since sulfur dioxide is mutually soluble in petroleum crudes and in connate water occupying the pores of a reservoir rock, the displacement of the petroleum by a flushing solution of sulfur dioxide in water is facilitated by reason of the resultant lowering of the viscosity of the displaced material. The action appears also to involve the in situ generation of wetting agents which assist in the movement of petroleum through the rock.

I have found that injection into a porous petroleum-bearing formation of sulfur dioxide dissolved in a major weight proportion of water serves to decrease the residual petroleum content to such an extent that the permeability of the formation to a following water flood is greatly enhanced. The benefit is most clearly marked in injection of sandstones and like unreactive minerals, preceding a water flood drive for secondary recovery. Similar benefits are also apparent in injection of carbonate rocks.

Is is therefore an object of the present invention to provide improved processes for treating underground formations for the purpose of increasing the permeability of the formation to fluids, by injecting the formation with aqueous solutions of sulfur dioxide.

It is also an object of the present invention to provide an improved leaching process for opening up flow channels leading from a well bore into a formation of a carbonate type of rock such as a limestone or a dolomite, by injecting sulfurous acid water solutions thereinto.

It is yet another object of this invention to provide an improved process for displacement of residual petroleum in the pores of a reservoir rock by flushing with weak solutions of sulfur dioxide in water, to increase the permeability of the swept formation to water flooding.

The stated objects will be demonstrated and other aspects and advantages of the invention will be made apparent from a study of the following description of its embodiments with reference to the accompanying figures of the drawing, wherein:

FIGURE 1 is a diagram showing apparatus for injection of sulfur dioxide solution into a formation through an injection well;

Figure 2:
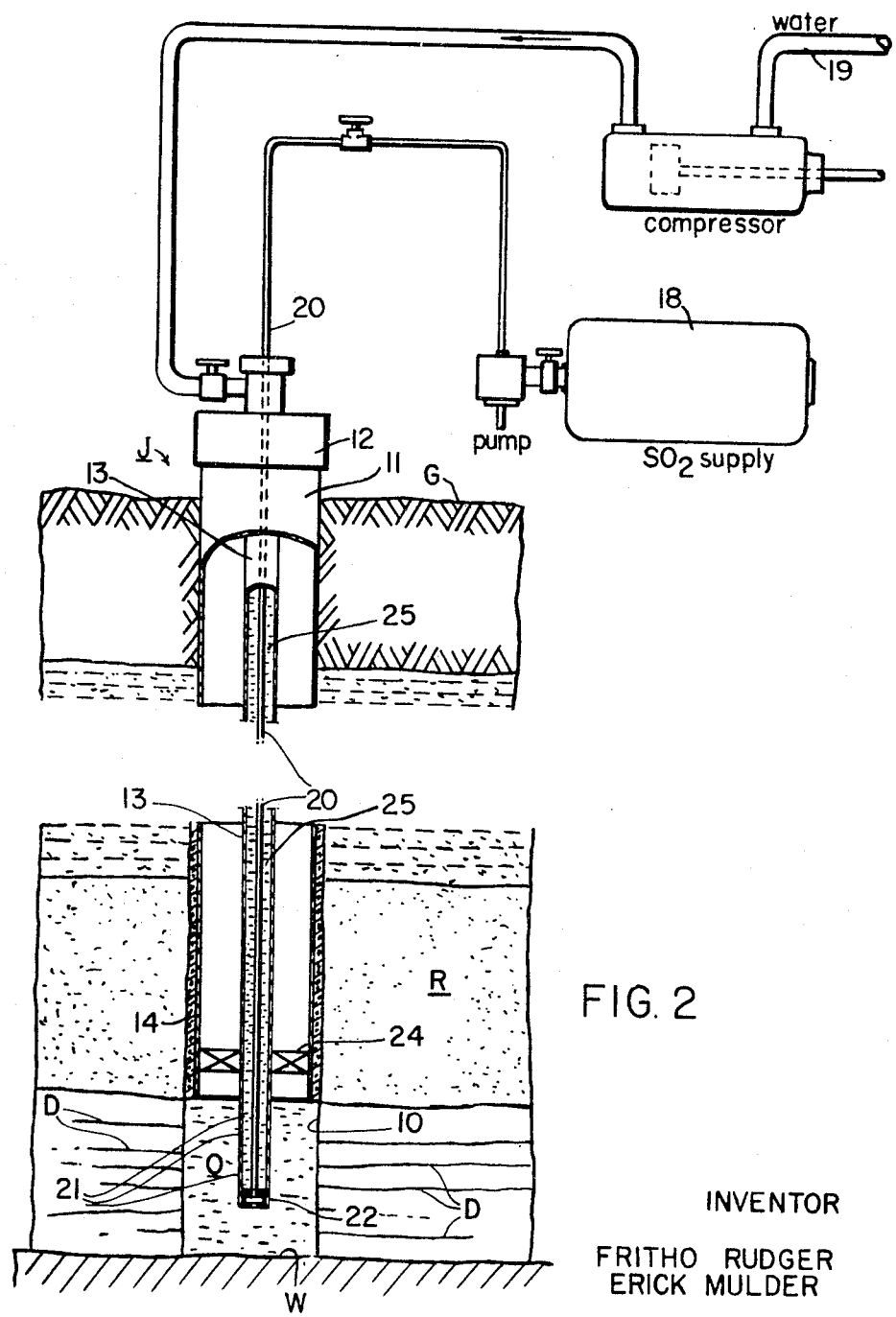
FIGURE 2 is a diagram showing alternative apparatus for injection of $SO_2$ and water separately.

In the drawing FIGURE 1, an injection well J comprises a borehole 10 penetrating into a rock formation R, having a casing 11, a casinghead 12, and a central run of tubing 13. In accordance with known formation treatment techniques, such casing is terminated short of the bottom W of the well. A cement sheath 14 bonds the casing to the well bore. The tubing-casing packer 24 effectively seals the annulus between the tubing 13 and the casing 11.

Above the surface G, suitable pumping means are provided, connected with the casinghead 12 by valve 16, for supplying an aqueous solution from a mixing unit 17, produced by proportioning a mixture of gaseous $SO_2$ delivered from a supply unit 18 under pressure with water, which may be formation water, from a supply duct 19. Ancillary control and monitoring devices such as pressure gauges and regulators, temperature and pH measurement and control units (not shown), are desirably associated with the apparatus in conformance with known techniques and need not be described here in greater particular.

The chemical activity of weak aqueous solutions of sulfur dioxide requires that all containers, pumps and ducts with which it will come into contact should be made of materials capable of withstanding its corrosive effects. Pure dry sulfur dioxide gas or liquid is not corrosive, and may be safely handled in copper lines with copper or brass fittings, but very small amounts of water vapour in $SO_2$ gas, or very small amounts of dissolved sulfur dioxide in water, are highly corrosive mixtures. Certain stainless steels are incapable of resisting corrosive attack by these mixtures. Valve seats and plugs, piping, fittings, gauges and control elements may be fabricated or lined suitably with lead, plastic, or with any of the alloys Hastelloy, Stellite, or Monel metal, which are resistant to corrosive action.

Another suitable method of injecting the $SO_2$ into a well is described in FIGURE 2, in which dry liquid $SO_2$ is injected through a "Macaroni tubing" 20 and is not mixed with the water until it reaches the bottom of the well below the tubing-casing packer 24. The water flows along the annular space 25 between the Macaroni string 20 and the inside of the regular tubing string 13 and is ejected through perforations 21 in the wall of the tubing string below the packer. The Macaroni string 20 is locked in the bottom of the tubing string by any suitable device such as a conventional packoff device which is well known and readily available in the oil industry. The bottom joints of the tubing 13 below the packer 24 may be made of any of the corrosion resistant materials heretofore described, and it may be advantageous to utilize the same material for the last few joints of the Macaroni tubing.

By the use of this technique, all contact with the corrosive aqueous solution of $SO_2$ is prevented with the casing and tubing strings in the well. Mixing of the dry liquid $SO_2$ and water occurs in the annular zone O surrounding tubing string 13.

Figure 3:
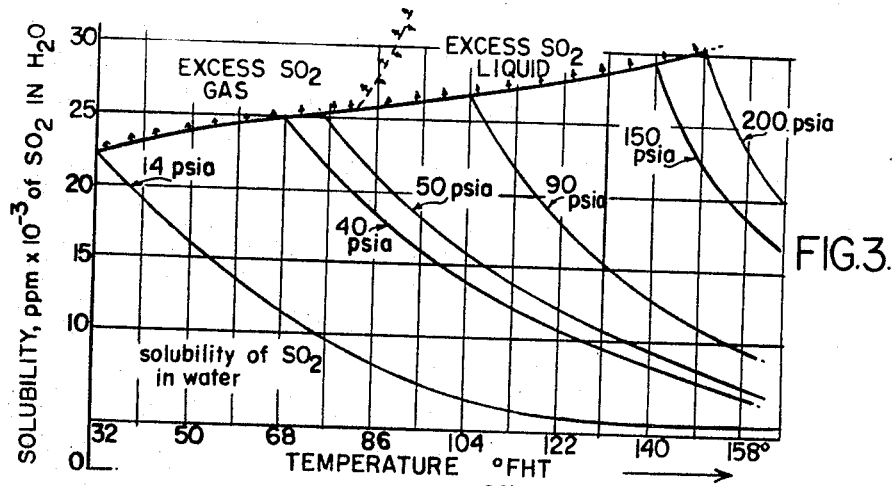
FIGURE 3 is a graph showing solubilities of sulfur dioxide in water and in crude oil at formation temperature and pressure.
Figure 4:
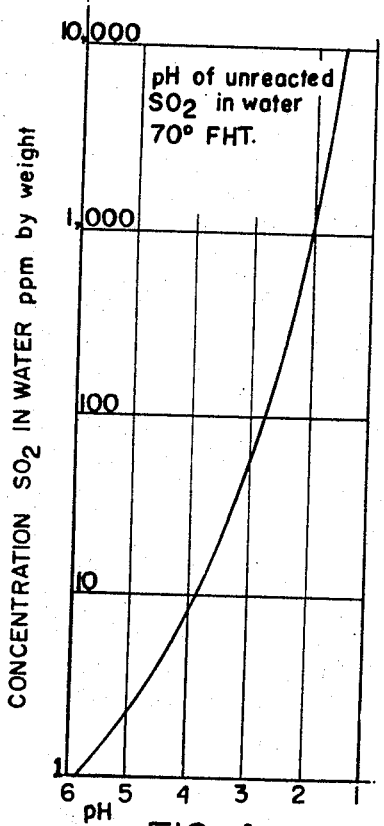
FIGURE 4 shows pH values of sulfurous acid formed by mixing various concentrations of sulfur dioxide in parts per million of $H_2O$.

The admixture of a minor weight proportion of sulfur dioxide in a major weight proportion of water, for example in the ratio of from about ten parts per million (p.p.m.) to about 10,000 p.p.m., produces a relatively strong acid, with a pH ranging at room temperature from about 4 to about pH 1.5, as shown by the graph, FIGURE 4. Higher concentrations, in the ranges shown by FIGURE 3, may range from about 50 pounds per barrel of 35 Imperial gallons to the upper solubility limit of nearly 150 pounds per barrel. Above this limit, which is temperature dependent, liquid $SO_2$ remains in equilibrium with the saturated solution. The reactivity of saturated solutions in the presence of liquefied $SO_2$ is not significantly greater than the reactivity of very dilute solutions, affording a very prolonged leaching action for the higher concentrations of $SO_2$ in water, including the two-phase liquid mixtures.

Figure 5:
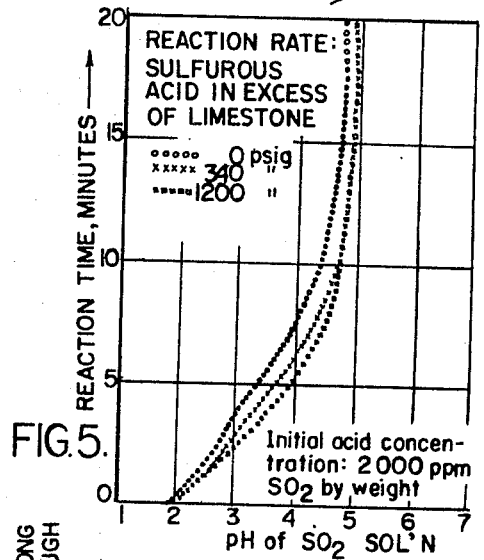
FIGURE 5 shows the reaction rates of sulfurous acid with limestone chips at various temperatures and pressures.
Figure 9:
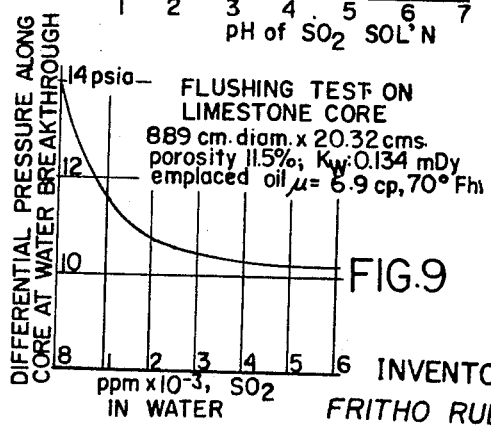
FIGURE 9 is a graph showing improvement in permeability to oil of a limestone when treated by a weak solution of sulfur dioxide.

The activity of a weak solution of sulfur dioxide in water, that is to say, from about 10 p.p.m. to about 500 p.p.m. is moderately high, as may be understood by reference to FIGURES 4 and 5. The latter graphically illustrates the reduction in pH of a solution initially containing 500 p.p.m. by weight of $SO_2$, when exposed for from 10 to 20 minutes to limestone chips. The sulfur dioxide ingredient is substantially spent at pH 4.7, corresponding to a concentration between one and two p.p.m. At the high pressures commonly pertaining at the bottom of a deep well, the reaction time is shortened, as indicated by the curve at 1200 p.s.i.g. The curve of FIGURE 4 extends upward and approaches pH 1 at high concentrations of $SO_2$ in water. Solutions whose $SO_2$ concentration is of the order of 100,000 p.p.m. are characterized by relatively large unionized content of $SO_2$. However, such strong solutions have a pH which may be less than 1.

According to the invention, the process of injecting a formation with an aqueous solution of $SO_2$, for example containing 500 p.p.m. of $SO_2$, consists in either pumping the premixed solution down the tubing 13, as in FIGURE 1, at a rate suitable for the purpose, or in metering flows of water in string 13 and liquid $SO_2$ in Macaroni tubing 20 to effect bottom-hole mixing in similar weight proportions. A bottom-hole pressure is maintained higher than the formation pressure, the pressure difference being any value from a few pounds per square inch to 2000 or more. The higher pressures will be exerted initially, and may be chosen to be sufficiently high to fissure or crack the rock R producing radial openings such as D, wherein the injected fluid will flow and promote channeling as the leaching reaction proceeds. The solution attack of the rock minerals may proceed according to the following reactions:

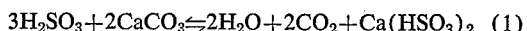
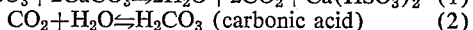
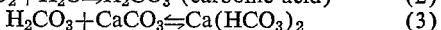
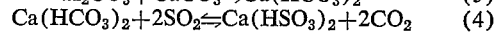
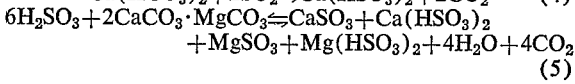

$$3H_2SO_3 + 2CaCO_3 \rightleftharpoons 2H_2O + 2CO_2 + Ca(HSO_3)_2 \quad (1)$$
$$CO_2 + H_2O \rightleftharpoons H_2CO_3 \text{ (carbonic acid)} \quad (2)$$
$$H_2CO_3 + CaCO_3 \rightleftharpoons Ca(HCO_3)_2 \quad (3)$$
$$Ca(HCO_3)_2 + 2SO_2 \rightleftharpoons Ca(HSO_3)_2 + 2CO_2 \quad (4)$$
$$6H_2SO_3 + 2CaCO_3 \cdot MgCO_3 \rightleftharpoons CaSO_3 + Ca(HSO_3)_2$$
$$+ MgSO_3 + Mg(HSO_3)_2 + 4H_2O + 4CO_2 \quad (5)$$

Unlike the bicarbonates of calcium and magnesium which are produced by processes employing carbon dioxide as an injection medium in a limestone or dolomite, the sulfites and bisulfites are not likely to precipitate out of the water solutions, and such amounts of carbon dioxide as are generated are held in solution in the petroleum and in the connate water or flooding solution, aiding in the displacement of the petroleum. The sulfites are reasonably soluble particularly at formation temperature, and are slightly basic. The bisulphites are extremely soluble in water, forming slightly acidic solutions.

In the process of drilling a carbonate rock formation, the mechanical abrading action of the bit tends to plug the pores exposed in the bore wall O, both by reason of the swaging action which forces minute fragments into any openings, and by reason of the high hydraulic pressures sustained during the drilling. Injection of sulfur dioxide solution is a highly satisfactory procedure for dissolving such fragments, and to enlarge the diameter of the well bore under prolonged contact with the acid solution. The liquid which permeates the porous rock adjacent the well bore carries on the leaching action as described so that eventually an extensive network of flow channels D is leached into the rock.

Figure 6:
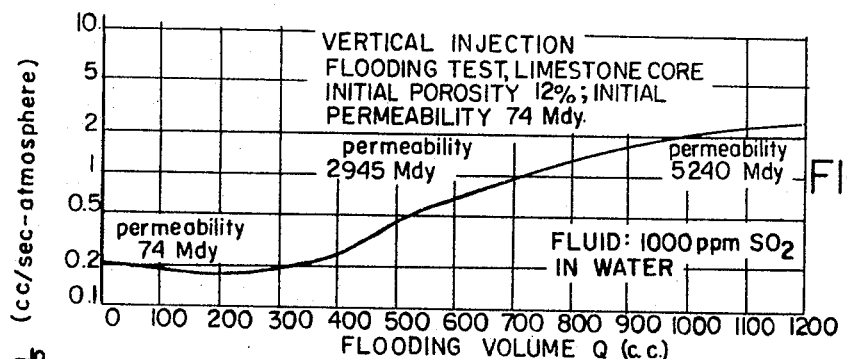
FIGURE 6 shows a plot of test data relating flow volume of injected sulfur dioxide solution with permeability of a limestone core.

Referring to FIGURE 6, the data relate to a test core obtained by diamond drilling the Harmattan Elkton limestone which is producing reservoir rock having an average porosity of about 13% and an initial permeabilty to water of 74 millidarcy (0.074 dy.). The test core was a cylinder of 3½ inch diameter with a length of 3½ inches between parallel end faces. The core was suitably mounted to confine flow entirely within the core between the end faces and was injected with a solution of 1000 p.p.m. of $SO_2$ by weight in water. The inlet and initial outlet pressures were respectively 1200 p.s.i.g. and 900 p.s.i.g. The flow volume was monitored and the rate controlled and plotted as a function of pressure (volume Q divided by pressure drop $\Delta P$).

It will be apparent that following an initial throughput about 12 core volumes, the permeability had begun to increase sharply with increased throughput, and ultimately reached a high value, 5.24 dy. The increase is more than 70-fold, for a throughput of just under 1200 cc. of flooding solution representing 1.2 grams of sulfur dioxide injected for a gross core volume of about 22 cc. It will be apparent that the permeability was still rising at the end of the test, and had already reached a value that would allow ample flow under very low pressure gradients.

Figure 7:
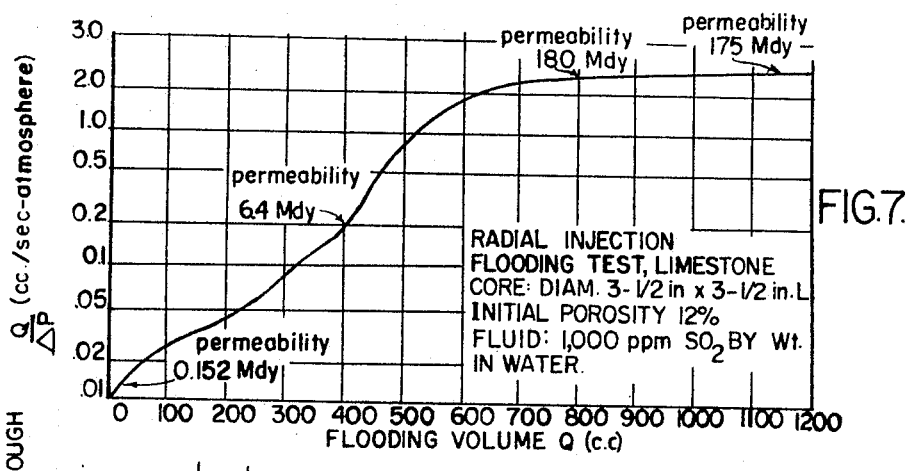
FIGURE 7 is a graph similar to FIGURE 5 showing data obtained by injecting another limestone core with sulfur dioxide solution.

In a further test the data of FIGURE 7 were obtained with a core cut from the same formation as that of the previous test, also measuring 3½ inches in diameter by 3½ inches long. An axial bore 3/32 inch in diameter was drilled through the core, and the core was mounted for radial injection into the central bore, the end faces being sealed except for the central bore. A solution of the same strength was injected under constant input pressure of 1200 p.s.i.g. and the flow rate measured and adjusted by regulating the back pressure. The flow rate was expressed in the same terms as in the previous test.

The sample core exhibited a very low initial permeability, 0.152 mdy. After a total volume of 1200 cc. of the solution was put through, the permeability had risen to 175 mdy., and the flow rate per unit of pressure drop had consistently increased through the entire test. Obviously larger permeabilities would have been achieved by prolonging the flushing, as the permeability was still increasing. The test demonstrates that under actual field conditions injection of a weak $SO_2$ solution would substantially enlarge the effective well diameter in the injected formation. Once the channel leaching has reached a suitable distance, as may be computed by determining the weight of sulfurous acid injected and the volume of mineral it will have dissolved, the well may be produced. The injected water with its dissolved salts and any suspended matter will mainly be recovered when the well is produced, being followed by petroleum products flowing out of the formation along channels D.

Where the producing rock formation R is comprised of minerals with which sulfurous acid is wholly or mainly non-reactive, as for example certain oil sands largely or entirely composed of silica, significant advantages are derived by preliminary injection of aqueous solutions of sulfur dioxide. In such reservoir rocks the pores are filled partly by petroleum, partly by connate water, and in some instances partly by gases. The capillary forces attracting the petroleum to the sand grains prevent complete separation of the petroleum therefrom when attempts are made to flush out the oil by a pure water flood. Where a well is to be used for injection of flooding water into a producing formation to effect a water drive of the petroleum for recovery at other wells, these capillary effects oppose permeation by water so that very high pressure and large expenditure of energy is required to force adequate volumes of water into the formation. In other words, the work of injection is very high. For instance, in certain sandstones a waterflood tends to move through the formation in preference to the petroleum which remains substantially undisturbed in most of the pores. It has long been a desired objective to flush out of the petroleum to the greatest degree possible in a zone surrounding an injection well, in order that the amount of energy expended in flooding the formation may be kept low. I have found that injection of a weak sulfur dioxide solution into a well of this type is a highly effective process for this purpose, and this primary injection medium may itself be injected with a significant economy in work as compared with other injection media.

Figure 8:
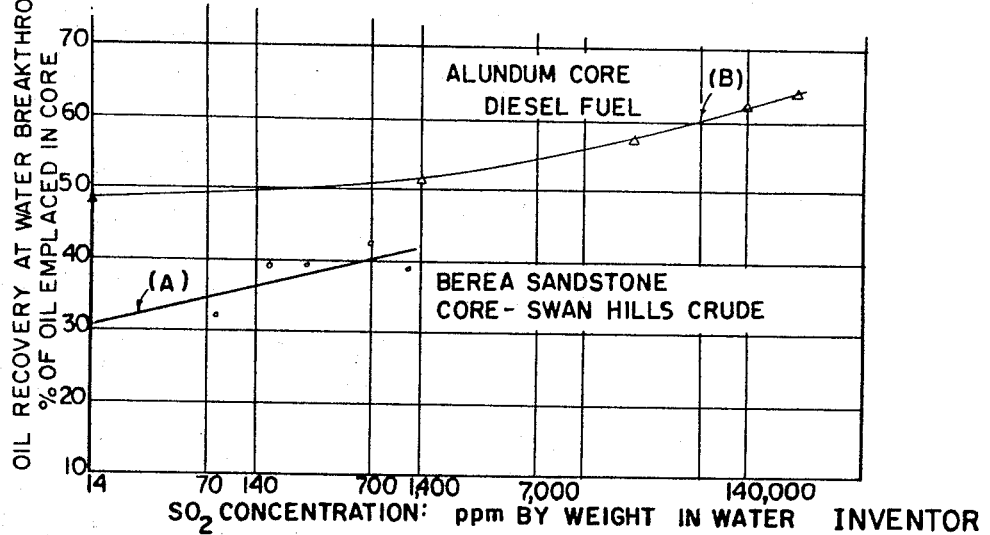
FIGURE 8 is a graph showing test data illustrating the decrease of oil saturation obtained by flushing with solutions of $SO_2$ in water, obtained in two non-reactive cores.

Referring now to FIGURE 8, the graph relates data in curve (A) obtained with a test core cut from Berea sandstone, the core being cylindrical and having length and diameter dimensions respectively of 27.8 cms. and 8.9 cms. The core was mounted for axial flooding with its cylindrical face sealed, and was injected at a constant high input pressure and a constant rate of 240 cc. per hour through one end face with various concentrations of sulfur dioxide in water. The rock porosity was 18.03% and the computed pore volume was 311 cc. Its permeability to water was 1.223 mdy. After an initial cleaning and water flood saturating the rock, a sweet crude oil, obtained from the Swan Hills, Alberta, field, having a viscosity of 3.5 cp. at 80° F., was emplaced in the sandstone by flowing about 6 pore volumes of the crude therethrough. At the beginning of each test the oil content was about 71% of the pore volume, i.e. about 220 cc.

The graph shows that for increasing concentrations of $SO_2$ the petroleum was increasingly displaced in preference to the connate water, as demonstrated by the fact that only 30% of the initial oil-in-place was flushed out at break-through of connate water from the discharge face of the core under a pure water flood. Oil displacement at increased water/oil ratios was higher with acidulated water flooding than with pure water.

It will be apparent therefore that injection of a water flood containing from about 500 to about 8000 p.p.m. by weight of $SO_2$ reduces the work of injection of the medium and flushes out almost half as much crude oil additionally as does a pure water flood of the same input volume.

The curve (B) on the same graph is a plot of oil displacement through a synthetic refractory core comprised of compacted and sintered aluminum oxide particles under flooding with water in which varying amounts of $SO_2$ had been dissolved. The oil was diesel fuel, chosen as representative of a range of petroleum crudes. The concentrations of the solutions ranged from about 14 p.p.m. by weight of $SO_2$ up to about 250,000 p.p.m. The oil recovery at breakthrough of the flooding solutions is plotted, showing that above about 1,000 p.p.m. the recovery represented an increasing percentage of the oil initially emplaced in the pores.

In limestones, the simultaneous increase in permeability to water due to chemical leaching action dissolving the carbonate rock and the improvement in the mobility of the petroleum in the pores of the rock are effects which jointly favor the use of sulfurous acid solutions for increasing the injectivity of a well in a carbonate rock. While the surface tension at the oil-mineral interface is undoubtedly different from that in a sandstone, evidence suggests that in-situ wetting agents generated by sulfur dioxide reacting with components of the petroleum aid in releasing the oil, and the viscosity of the petroleum is reduced by the solution therein of minor amounts of some agent either generated or liberated by the sulfurous acid. Whatever the explanation, positive benefits are obtained, as will be apparent from the following test.

A limestone core having a porosity of 11.5%, a length of 20.32 cms. and a diameter of 8.89 cms., with an initial water permeability of 134 mdy., was first saturated with water after cleaning, and then with oil. The latter was emplaced by flowing 750 cc. (about 5 pore volumes) of a light stable oil having a viscosity of 6.9 cp. at room temperature through the core from end to end. The volume retained was about 30% of the pore volume. A series of flushing tests were carried out, each using as flooding medium pure water in which increasing concentrations of sulfur dioxide were dissolved. The pressure drop was regulated to maintain a constant flow rate of 320 cc. per hour through the core.

Whereas under water flood the pressure drop across the length of the core was 14 pounds per square inch, the acid solutions produced marked reductions in the pressure gradient required. Substantial improvement was obtained with concentrations of $SO_2$ in the range from about 100 p.p.m. to about 5000 p.p.m. by weight. At an optimum concentration of 1200 p.p.m., the permeability of the rock to oil flow was increased from about 209 mdy. to about 293 mdy. The data, shown in FIGURE 8, demonstrate that while a tight limestone reservoir rock is benefited primarily by the channelling of the formation by flooding with an aqueous solution of $SO_2$, where the permeability of the rock to oil flow is initially high, a marked increase in such permeability may be gained by using acidulated water as injection medium. For each rock, the optimum concentration may be determined empirically, and will lie in a range below about 5,000 p.p.m.

Once the residual oil in the formation has been brought to a suitably low level, in a zone whose radial extent is such that the work of injection is mainly due to the resistance of the unswept formation surrounding the treated zone, the use of a pure water flood may be resorted to for economy. However, the injection of acidulated water may be continued indefinitely where the cost of the sulfur dioxide is suitably low, as where the energy cost saved by use of the medium corresponds to the cost of the additive.

The foregoing description clearly verifies the attainment of the stated objects of the present invention, and sets forth the preferred embodiments of the novel processes by which the invention may be put into effect. Many variants in the processes will naturally occur to those skilled in the art, and I reserve unto myself all such obvious modifications as lie within the ambit of the appended claims.

I claim:

1. A method of enhancing the permeation of a porous petroleum-bearing underground rock formation by a flooding medium from an injection well bore penetrating into said formation, which comprises forcing an aqueous solution of sulfur dioxide into said formation under pressure from said well bore in an amount and for a time sufficient to decrease the residual petroleum content throughout a zone in said formation surrounding said well bore, and thereafter injecting a flooding medium into said injection well bore.

2. The method of claim 1 wherein said sulfur dioxide is present in said well bore as a dissolved phase and a liquefied excess.

3. The method of claim 1 wherein said sulfur dioxide is present in said well bore in a weight proportion to said water ranging from about one part per million to the limit of solubility of sulfur dioxide therein at the temperature and pressure conditions in said formation.

4. The method of claim 3 wherein said sulfur dioxide is introduced into said formation in a proportion lying in the range from about 10 parts per million to about 150,000 parts per million.

5. A process for upwardly adjusting the injectivity of flooding water into a porous underground oil-bearing rock formation which comprises providing an injection well penetrating into said formation, introducing flooding water into said well under injection pressure while simultaneously commingling a minor weight proportion of anhydrous liquid sulfur dioxide with said water adjacent said formation to promote solution in said water, continuing the injection of said solution until it occupies substantially the entire formation pore volume of a zone adjacent said well, and thereafter injecting flooding water into said well.

6. The process of claim 5 wherein said weight proportion ranges from about 10 parts per million to about 150,000 parts per million.

7. The process of claim 5 wherein said rock formation is an oil-bearing porous sandstone.

8. The process of claim 5 wherein said flooding water is acidified to have an initial sulfur dioxide content in the range from 1 to 150 parts per million.

References Cited

UNITED STATES PATENTS

| | | | |
|---|---|---|---|
| 2,910,123 | 10/1959 | Elkins et al. | 166—9 |
| 2,964,109 | 12/1960 | Martin | 166—9 X |
| 2,968,350 | 1/1961 | Slobod et al. | 166—9 |
| 3,063,499 | 11/1962 | Allen | 166—42.1 |
| 3,096,821 | 7/1963 | Dyes | 166—9 |
| 3,120,262 | 2/1964 | Archer | 166—9 |
| 3,138,204 | 6/1964 | Richardson | 166—9 X |

CHARLES E. O'CONNELL, *Primary Examiner.*

JACOB L. NACKENOFF, STEPHEN J. NOVOSAD, *Examiners.*